United States Patent
Goddard

(10) Patent No.: US 7,324,857 B2
(45) Date of Patent: Jan. 29, 2008

(54) METHOD TO SYNCHRONIZE PLAYBACK OF MULTICAST AUDIO STREAMS ON A LOCAL NETWORK

(75) Inventor: Mark D. Goddard, Rancho Santa Margarita, CA (US)

(73) Assignee: Gateway Inc., Irvine, CA (US)

( * ) Notice: Subject to any disclaimer, the term of this patent is extended or adjusted under 35 U.S.C. 154(b) by 779 days.

(21) Appl. No.: 10/127,013

(22) Filed: Apr. 19, 2002

(65) Prior Publication Data

US 2003/0200001 A1   Oct. 23, 2003

(51) Int. Cl.
*G06F 17/00* (2006.01)
(52) U.S. Cl. ...................................................... 700/94
(58) Field of Classification Search ................ 381/303, 381/310, 56, 300, 301, 306, 96, 89, 77, 79; 700/94; 715/727; 375/356
See application file for complete search history.

(56) References Cited

U.S. PATENT DOCUMENTS

| | | | |
|---|---|---|---|
| 3,798,650 A | 3/1974 | McComas et al. | |
| 4,005,266 A | 1/1977 | Lehr et al. | |
| 4,234,958 A | 11/1980 | Pipes et al. | |
| 4,543,657 A | 9/1985 | Wilkinson | |
| 4,843,617 A | 6/1989 | Marshall et al. | |
| 5,146,585 A | 9/1992 | Smith, III | |
| 5,202,761 A | 4/1993 | Cooper | |
| 5,386,478 A * | 1/1995 | Plunkett | 381/103 |
| 5,388,102 A | 2/1995 | Griffith et al. | |
| 5,402,450 A | 3/1995 | Lennen | |
| 5,416,808 A | 5/1995 | Witsaman et al. | |
| 5,469,467 A | 11/1995 | Vella-Coleiro | |
| 5,530,704 A | 6/1996 | Gibbons et al. | |
| 5,655,144 A | 8/1997 | Milne et al. | |
| 6,061,655 A | 5/2000 | Xue | |
| 6,184,876 B1 | 2/2001 | Miller | |
| 6,243,372 B1 | 6/2001 | Petch et al. | |
| 6,247,135 B1 | 6/2001 | Feague | |
| 6,249,319 B1 | 6/2001 | Post | |
| 6,639,989 B1 * | 10/2003 | Zacharov et al. | 381/303 |
| 6,741,708 B1 * | 5/2004 | Nakatsugawa | 381/79 |

(Continued)

FOREIGN PATENT DOCUMENTS

EP    0 737 009    10/1996

(Continued)

OTHER PUBLICATIONS wikipedia.com entry for Delay (audio effect).*

(Continued)

*Primary Examiner*—Sinh Tran
*Assistant Examiner*—Andrew C Flanders
(74) *Attorney, Agent, or Firm*—Scott Charles Richardson

(57) ABSTRACT

A method is provided for synchronizing the playback of a digital audio broadcast on a plurality of network output devices using a microphone near a source, embedded control codes, and the audio patterns from the network output devices. An optional, additional manual adjustment method relies on a graphical user interface for adjustment and audible pulses from the devices which are to be synchronized. Synchronization of the audio is accomplished with clock synchronization of the network output devices. The digital audio broadcast from multiple receivers does not present to a listener any audible delay or echo effect.

30 Claims, 7 Drawing Sheets

U.S. PATENT DOCUMENTS

| | | | |
|---|---|---|---|
| 6,798,889 B1 * | 9/2004 | Dicker et al. | 381/303 |
| 6,856,688 B2 * | 2/2005 | Cromer et al. | 381/303 |
| 6,928,172 B2 * | 8/2005 | Ohta | 381/98 |
| 2003/0031333 A1 * | 2/2003 | Cohen et al. | 381/303 |

FOREIGN PATENT DOCUMENTS

| | | |
|---|---|---|
| WO | WO 01/16781 | 3/2001 |

OTHER PUBLICATIONS http://www.soundmaster.com/smartsyn.htm.
http://www.cis.ohio-state.edu/cgi-bin/rfc/rfc 1889.html.
http://www.cis.ohio-state.edu/cgi-gin/rfc/rfc 1305.html.
http://www.cis.ohio-state.edu/cgi-bin/rfc/rfc 1889.html, Jan. 1996.
http://www.cis.ohio-state.edu/cgi-gin/rfc/rfc 1305.html, Mar. 1992.

* cited by examiner

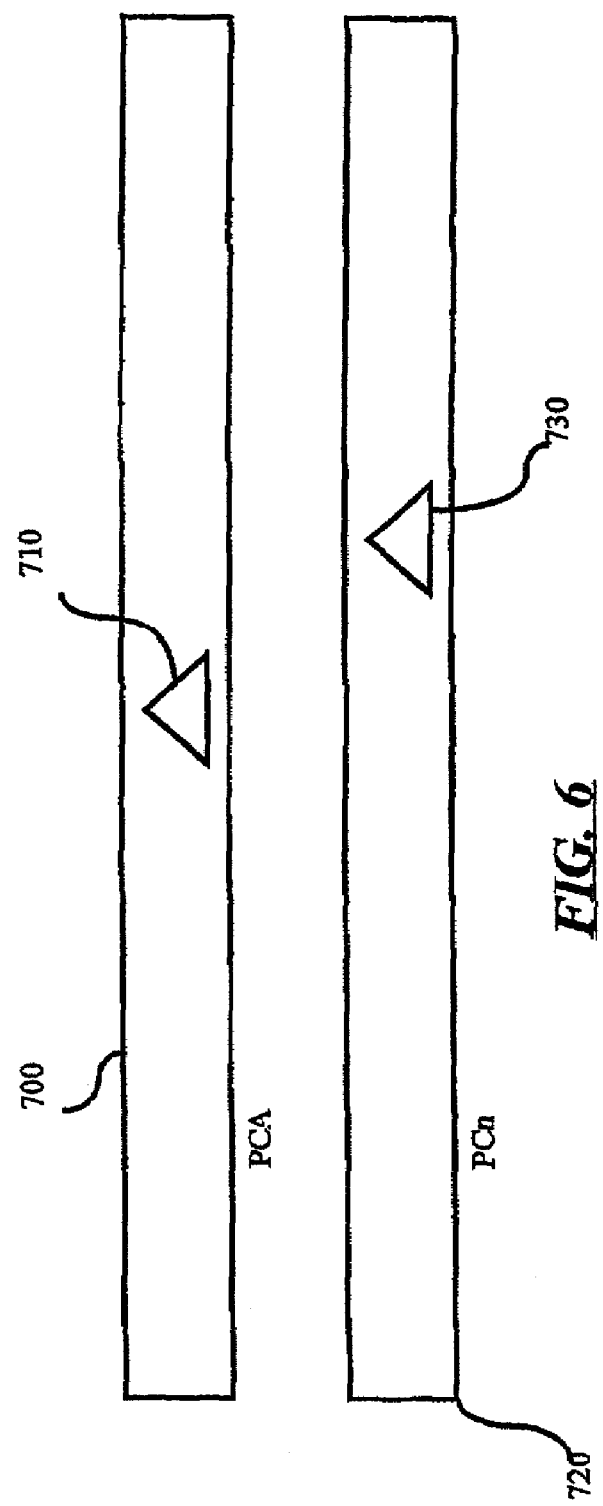

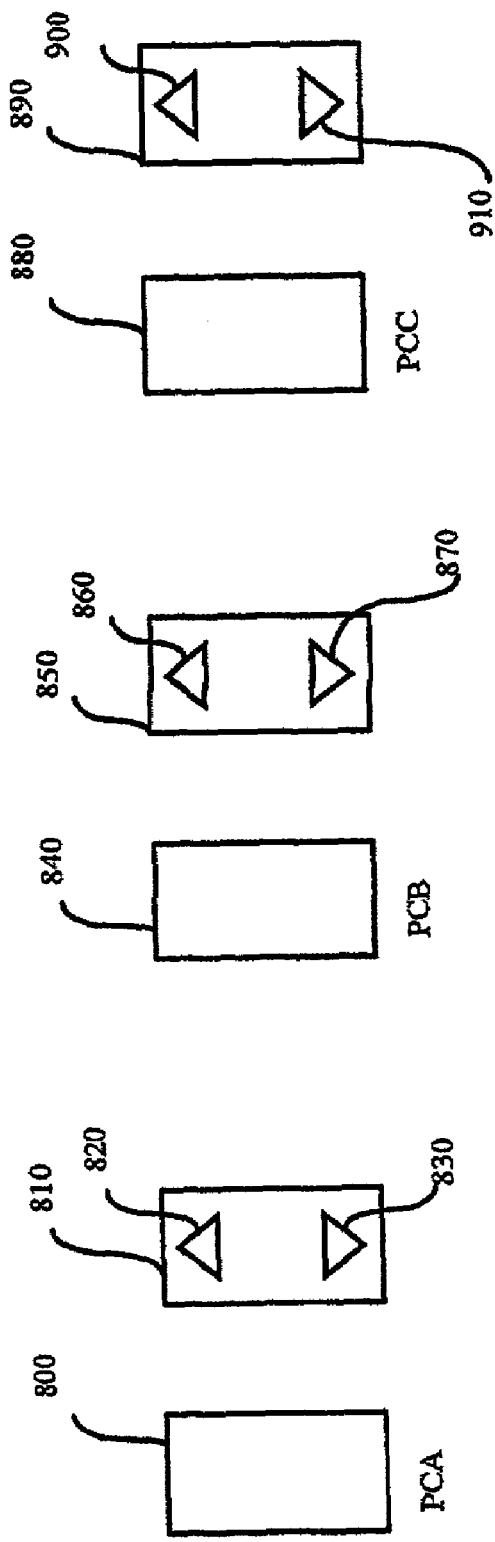

METHOD TO SYNCHRONIZE PLAYBACK OF MULTICAST AUDIO STREAMS ON A LOCAL NETWORK

FIELD OF THE INVENTION

This invention generally relates to audio playback for multiple devices, and specifically, to synchronizing the audio playback.

BACKGROUND OF THE INVENTION

When two or more audio devices play at the same time, there may be an echo effect that reduces the enjoyment of the sound by the listener. These audio devices may be cabled to a controller device which provides the audio data to them. A bus may be used to supply this data. Alternatively, the different devices may communicate with each other through wireless communication, such as through an RF or infrared port.

In a system in which one computer or device broadcasts a single digital audio stream that is then simultaneously received by more than one receiving device, the different receiving devices will often play their audio slightly out of sync with each other, due to differing latencies in receiving and processing the digital audio stream. This produces an echo or delay effect which causes a listener to receive the same audio at slightly different times from the multiple devices. An additional echo effect may arise from a difference in distance from the listener to the various receiving devices. The listener's enjoyment is impaired.

Prior devices have used clock synchronized receiving devices. In one prior device, a transmitting device inserted control track pulses into the digital audio stream at known intervals. Each receiving device obtained the time of the received track pulse and then delayed the playback of the audio stream until the received pulse was aligned with the next pulse at the known interval. In another prior device, the transmitting device transmitted to each receiving device a waveform sample, the playback time of the sample, and the latency value of the receiving device. Each receiving device then delayed the playback of the audio stream until the waveform sample was aligned with the received playback time of the sample.

None of the prior devices used audio patterns and a microphone for obtaining feedback as part of the synchronization method. Furthermore, these prior devices required clock synchronization of the transmitting device and/or the playback devices. Clock synchronization tends to increase circuit complexity, and thereby increase costs.

A method and apparatus for synchronizing the playback of audio from two or more devices is needed which does not require clock synchronization.

SUMMARY OF THE INVENTION

The present invention provides a method and apparatus for synchronizing the playback of the audio from two or more audio receivers so that there is no audible delay or echo effect between them when listened to simultaneously without using clock synchronization.

In the closed-loop feedback system for synchronizing playback of multicast audio streams on a local network of the present invention, control codes are embedded in the audio stream to cause the playback devices to emit audio patterns that are detected by a microphone connected to a source of the audio stream. The source determines the latency from sending to playback, and then sends packets to each playback device to introduce additional latency into the audio stream to achieve synchronized playback.

In a first aspect of the present invention, a method of audio synchronization on a home network is disclosed which includes sending a control code to a specific one of two or more receiver devices, outputting audible signals from two or more receiver devices on the home network, recording a first time difference between the time of sending a control code to the specific one of the two or more receiver devices and the time the audible signal is received from the specific one of the two or more receiver devices, recording a second time difference between the time of sending a control code to an other specific one of the two or more receiver devices and the time the audible signal is received from the other one of the two or more receiver devices, and automatically adjusting the relative delay of audio information signals to one of the specific ones of the two or more receiver devices.

In a second aspect of the present invention, a system for synchronizing audio playback of multiple receiving devices is disclosed which includes a transmitting device and two or more receiving devices, wherein the receiving devices are synchronized through control codes sent from the transmitting device to each of the two or more receiving devices and audio patterns transmitted from each of the two or more receiving devices to the transmitting device.

In a third aspect of the invention, a system for synchronizing the audio playback of two or more receiving devices is disclosed which includes means for transmitting control codes embedded in an audio stream, means for receiving the control codes embedded in the audio stream, means for transmitting audio patterns generated in response to the control codes, and means for receiving the audio patterns.

It is to be understood that both the forgoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which:

FIG. 6 illustrates horizontal sliding bars for a graphical user interface for manual synchronization; and FIG. 7 illustrates vertical bars for a graphical user interface for manual synchronization.

DETAILED DESCRIPTION OF THE INVENTION

Reference will now be made in detail to the presently preferred embodiments of the invention, examples of which are illustrated in the accompanying drawings.

Referring generally now to FIGS. 1 through 7, exemplary embodiments of the present invention are shown.

The present invention describes a method of enabling simultaneous output of audio signals on multiple output devices by the use of control codes embedded in multicast multimedia stream to cause specific receiving devices to emit easily detectable audio patterns which can then be detected by a microphone connected to the source of the multimedia stream. These audio patterns may or may not be audible to the human ear. The source may then accurately determine the total latency from sending to playback. The source may then send command packets to each playback device to determine how much additional latency it needs to introduce into the playback stream to achieve synchronization.

Optionally, this invention also allows manual fine tuning the synchronization of audio output on multiple networked output devices. The method comprises the audible output of a audio signal from two or more receiving devices and allows the user to increase or decrease the timing delay in reference to the audible sound. Once the signals sound simultaneous to the user, the delay is recorded for the devices and added to subsequent audio output to reproduce the delay identified by the user to make the two devices sound synchronized.

The control codes embedded in the multicast multimedia stream are only a small part of the audio stream. The transmitting source device might or might not be playing audio, and could be remote from the receiving devices. If the transmitting device is local and playing audio, it may be made to participate in the same synchronized audio playback method as described below. This method requires no clock synchronization of the audio transmitting device, only modification of the digital audio stream to include the control codes. The source device keeps a record of the latency value for each receiver.

All devices may buffer the audio stream. Some amount of buffering of the audio stream is occurring, to allow the receiving devices to search forward and backward in the audio data, and to allow them to delay or shift audio playback. Signal transmission may be in analog or digital format.

Figure 1:
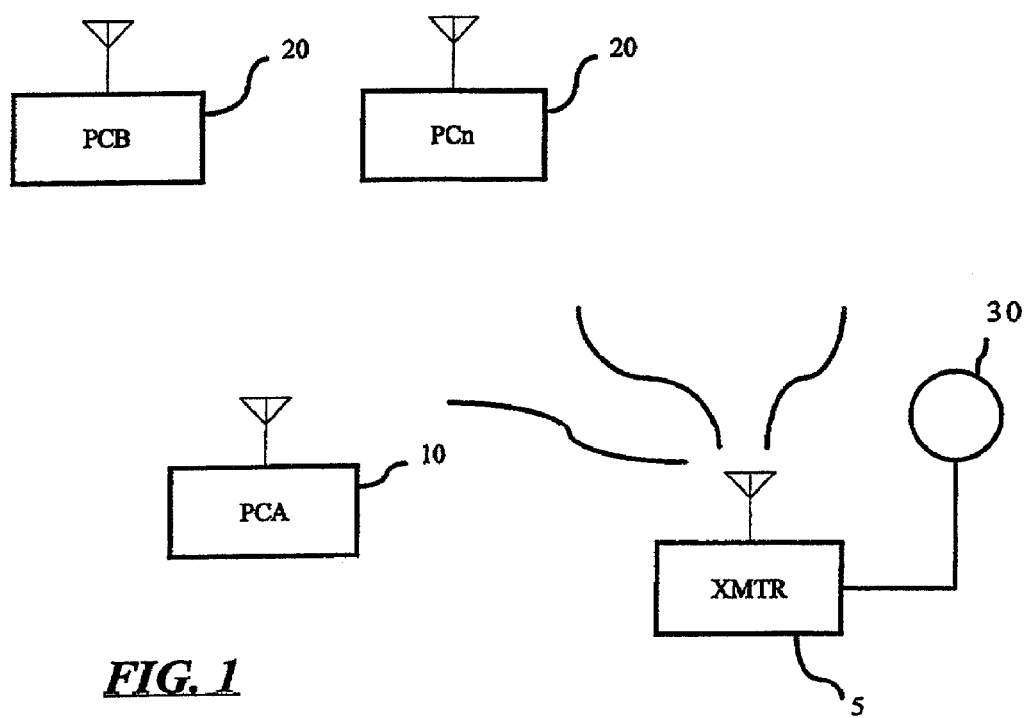
FIG. 1 illustrates a system having a plurality of audio playback receiver devices.

FIG. 1 illustrates a system of several devices. Transmitting device XMTR 5 sends the audio stream, sync information, time and other data to receiving devices PCn, such as PCA, PCB and PCn. Transmitting device XMTR 5 controls audio playback for the system. The devices may be interconnected by a bus cabling or may communicate with one another through wireless communication such as radio frequency or infrared. A microphone 30 or other audio or sound pickup device is attached or proximate to the transmitting device XMTR 5.

Several discrete sub-processes are used in the present invention. These include a latency detector and manual fine tune control.

An average latency detector detects the average latency between transmitting a signal to a device, and the device receiving the signal. "Symmetrical latency" is not assumed between two computers because the time for the sound waves generated in the testing and synchronization of the receiver devices to travel may be considerably longer than the combined time for the control code to travel between the source and the receiver device and the processing of the control code to generate an audio pattern. This is because in air, between 0 and 100 degrees Fahrenheit, sound travels at slightly more than 1 foot per millisecond and the electromagnetic waves, used to transmit data between the source and the receiver device and processing within the receiver device, travel at nearly a million times faster. Even the propagation delays and computer instruction cycle times, at most a low number of microseconds, found in the receiver device are insignificant compared to the sound wave travel time.

All receiver devices may account for latency of their own audio playback subsystem. There are three different methods for this, each of which would occur after the other processes described herein have been used to synchronize the clocks on all audio playback devices: 1) shifting the playback by a predetermined value, such value determined through empirical testing of the actual playback device; 2) shifting the playback by a predetermined value, such value determined at run time, by the customer, using the manual audio synchronization fine-tune control, to determine the actual latency of the device's internal audio subsystem; and 3) fine-tuning the clock synchronization at run time, by the customer, using the manual audio synchronization fine-tune control.

Figure 2:
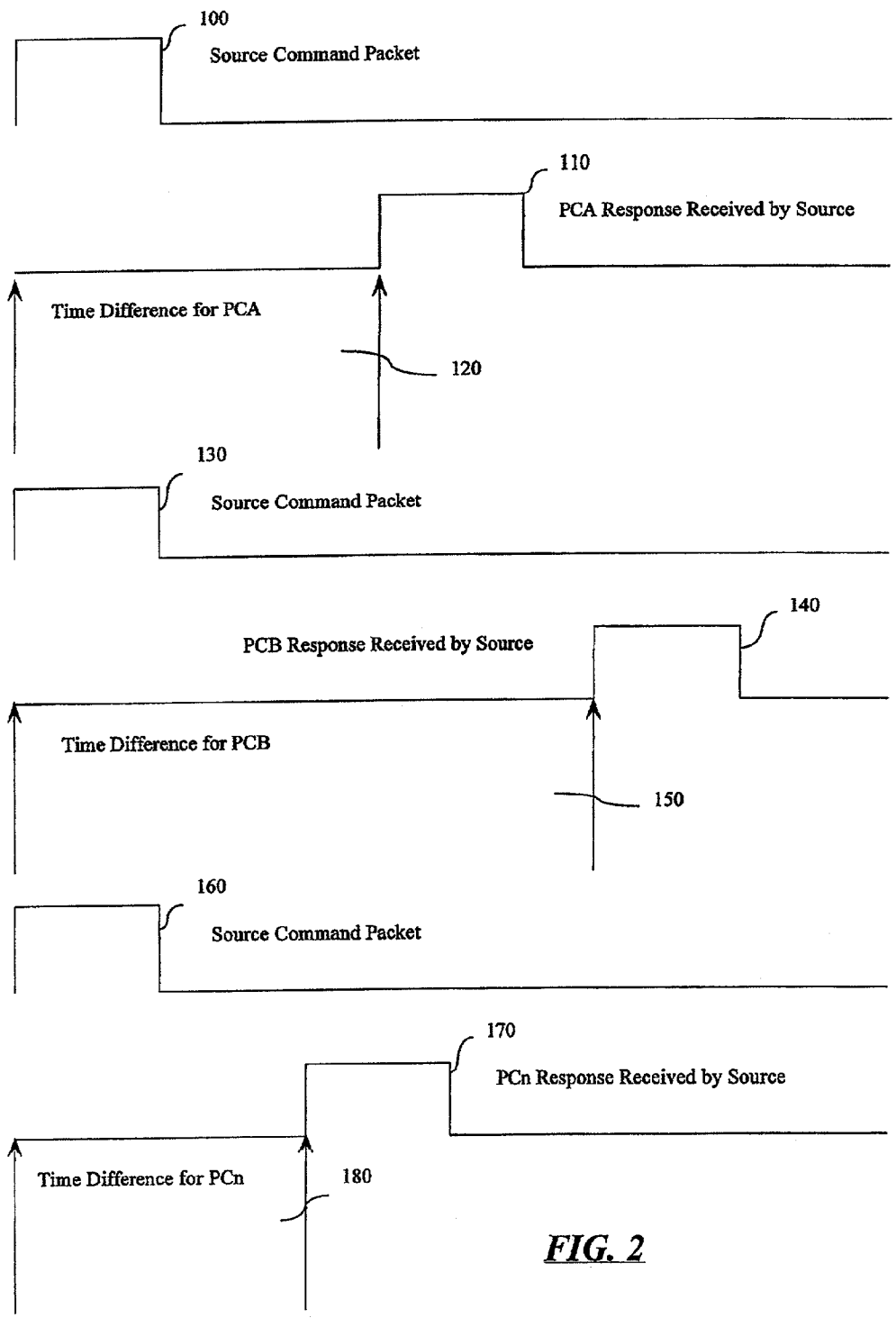
FIG. 2 illustrates exemplary responses from three receiver devices.

FIG. 2 illustrates an example of an n receiver device system, where n is a natural number. The value of n may be two, three, ten, or some other positive integer. Here, relative times are displayed from the time a control code or command packet is sent by the transmitter 100, 130, 160 to the receipt 110, 140, 170 of the audio pattern by the source or audio pattern receiving device coupled to the source. As shown, travel time differences 120, 150, 180 may be appreciable between the receiver devices. Because of the high speed of electromagnetic wave signals in transmitting the control codes and the high speed of electronic processing circuitry, the great bulk of the travel time is due to the travel of the sound waves from the receiver devices to the acoustic pick up device, such as a microphone. Roughly, for every millisecond of travel time, the acoustic wave travels slightly over one foot. At 0 degrees Fahrenheit, sound travels at approximately 1051 feet per second. At 100 degrees Fahrenheit, sound travels at approximately 1162 feet per second.

Figure 3:
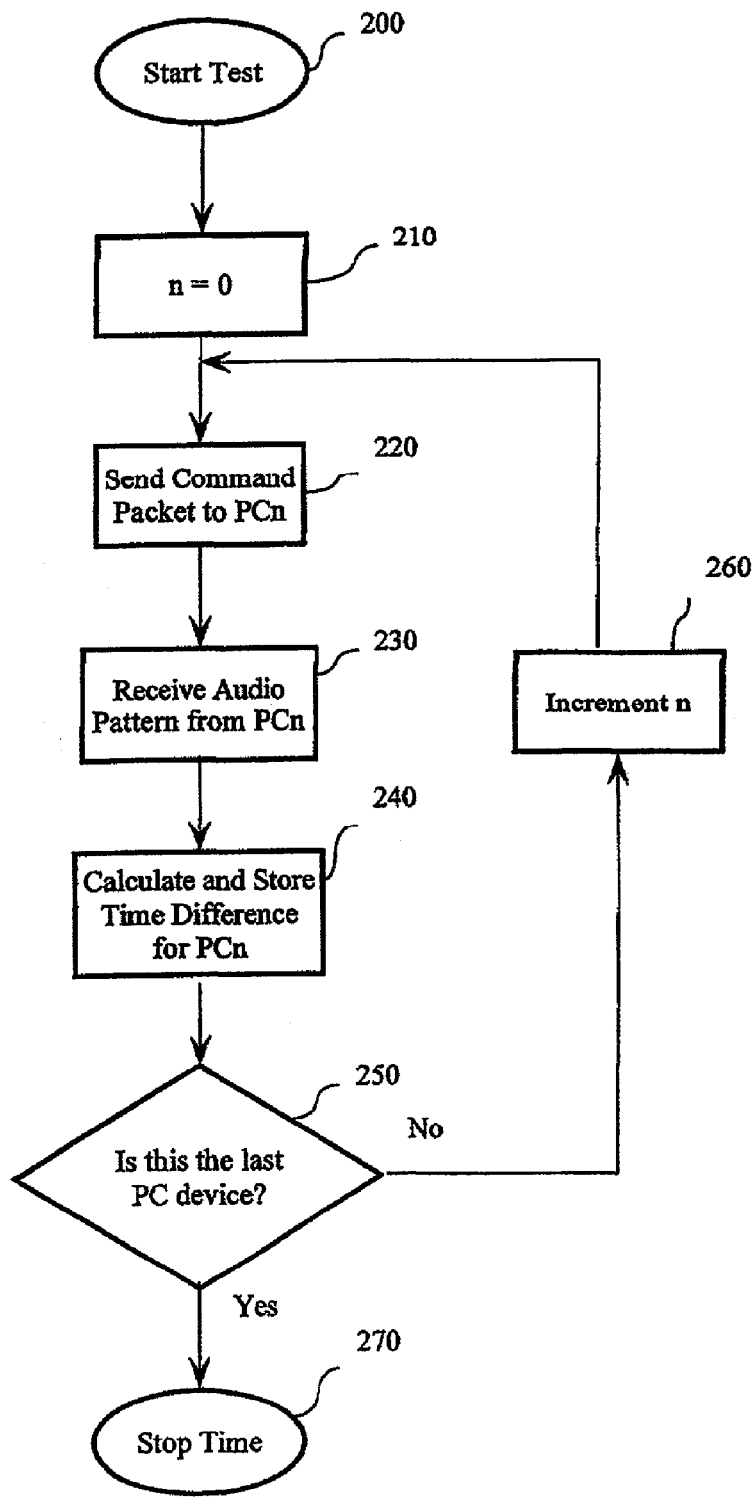
FIG. 3 illustrates a flow chart of method steps of the present invention.

FIG. 3 illustrates a flow chart of the method of the present invention. The method may be implemented as hardware, software, firmware, or a combination on the transmitter or source device. The test, step 200, may be conducted with a periodicity or as needed. In step 210, the receiver device address is initialized. The transmitter sends a command packet to PC number n. This command packet may consist of control codes. It may be placed directly in the audio stream. The designated receiver device PC number n then receives the device and generates an audio pattern. The audio pattern may or may not be audible. In step 230, the audio pattern is received by the pickup device near or attached to the transmitter or source device. The difference in time between sending out the command packet and receipt of the audio pattern is calculated in step 240 and stored for further processing. In step 250, there is a determination made as to whether this is the last one of the receiver devices to be tested. If it is not, the next receiver device is selected in step 260 and processing repeats for that unit. The time differences of the various receiver devices are compared to one another. The one which has the longest travel time may be taken as a reference. The delay values for the other receiver devices may be derived by subtracting the travel time of each of the other receiver devices from the longest travel time. This information is then sent to the respective receiver devices which, accordingly, postpone their playback times. Other variations of the method may be employed. In fact, if buffering of the audio stream is used, the playback of the audio by the receiving devices may be arranged in various ways, including advancing the playback of the audio to the time of the audio playback of the fastest response audio playback receiver device.

Figure 4:
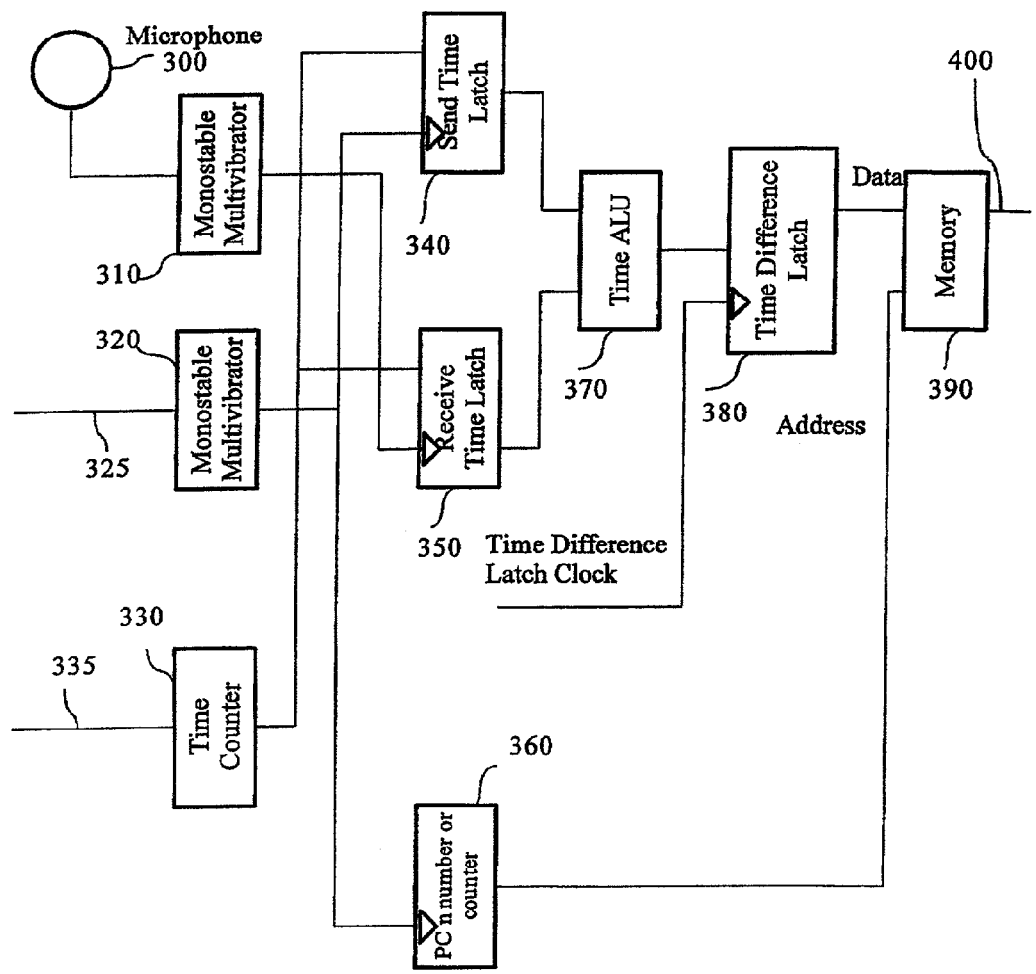
FIG. 4 illustrates an exemplary circuit for deriving the time differences or delay in response from the receiver devices.

FIG. 4 illustrates an exemplary hardware embodiment of calculating the travel times of the receiver devices PCn, PC number n, where n, as an identifier of the PC, varies from 1 to a positive integer greater than one. An internal clock 335 continually increments a time counter 330. The time count generated is always presented to the input of the send time latch 340 and the receive time latch 350. The resolution of the counter 330 may be 8 bit, 16 bit, or another number of bits. For example, 18 bit resolution provides an resolution greater than one in one hundred thousand. Upon the receipt of transmission signal of a command packet representing embedded control codes in an audio stream, a transmission of command packet clock pulse is generated from a device 320 such as a monostable multivibrator. This command packet transmission clock pulse causes the time to be latched by the send time latch 340 and the PC number of the receiver device to be updated. The designated receiver device generates an audio pattern which is received by the microphone 300 in response to the command packet. This triggers another clock pulse device 310 which may be from a monostable multivibrator. This audio pattern received clock causes latching of the time of receipt of the audio pattern. After a small period of time, several nanoseconds, the input signals to the time difference arithmetic logic unit 370 are sufficiently stable. The time difference is then presented to the time difference latch 380. On the next time difference latch clock pulse the data is latched and presented to the memory 390. The address of the time difference is linked to the device number of the receiver device PCn. Further processing, such as adding an address offset to the PC number may be used. A clock for the memory 390 causes the data to be entered into the memory. This information may later be picked up for further processing to determine which receiver device should be used as a reference.

A manual audio synchronization fine-tune control allows the user to "fine tune" the end results of automated synchronization. This means the user may want either to add relative delays in the audio for certain effects or to eliminate echo. It also allows the user to manually determine the internal latency of a device audio playback subsystem, by comparing the amount and direction of playback latency error between itself and a reference system with a known internal audio subsystem latency value. The system requires at least two devices playing audio, one that is the reference (PCA), and one that is adjusted by the user (PCB). In one embodiment, the method assumes that the reference player PCA always buffers and delays its own audio playback, so that PCB is able to move its own playback either forward or backward in time, relative to PCA. PCA synchronizes its clock with PCB. PCA emits an audible high-pitched pulse every n seconds, on even n second boundaries. PCB emits an audible pulse every n seconds, on even n second boundaries. PCB displays a graphic slider control to the user, defaulted to "centered" position. As the user slides the control left or right, PCB increments/decrements a correction value, and simultaneously shifts the audio click forward or backward in time. The user adjusts the slider until the two clicks converge and sound to the user as a single click. The resultant correction value may be added or subtracted from PCA's known internal latency value, to determine PCB's internal latency value.

Figure 5:
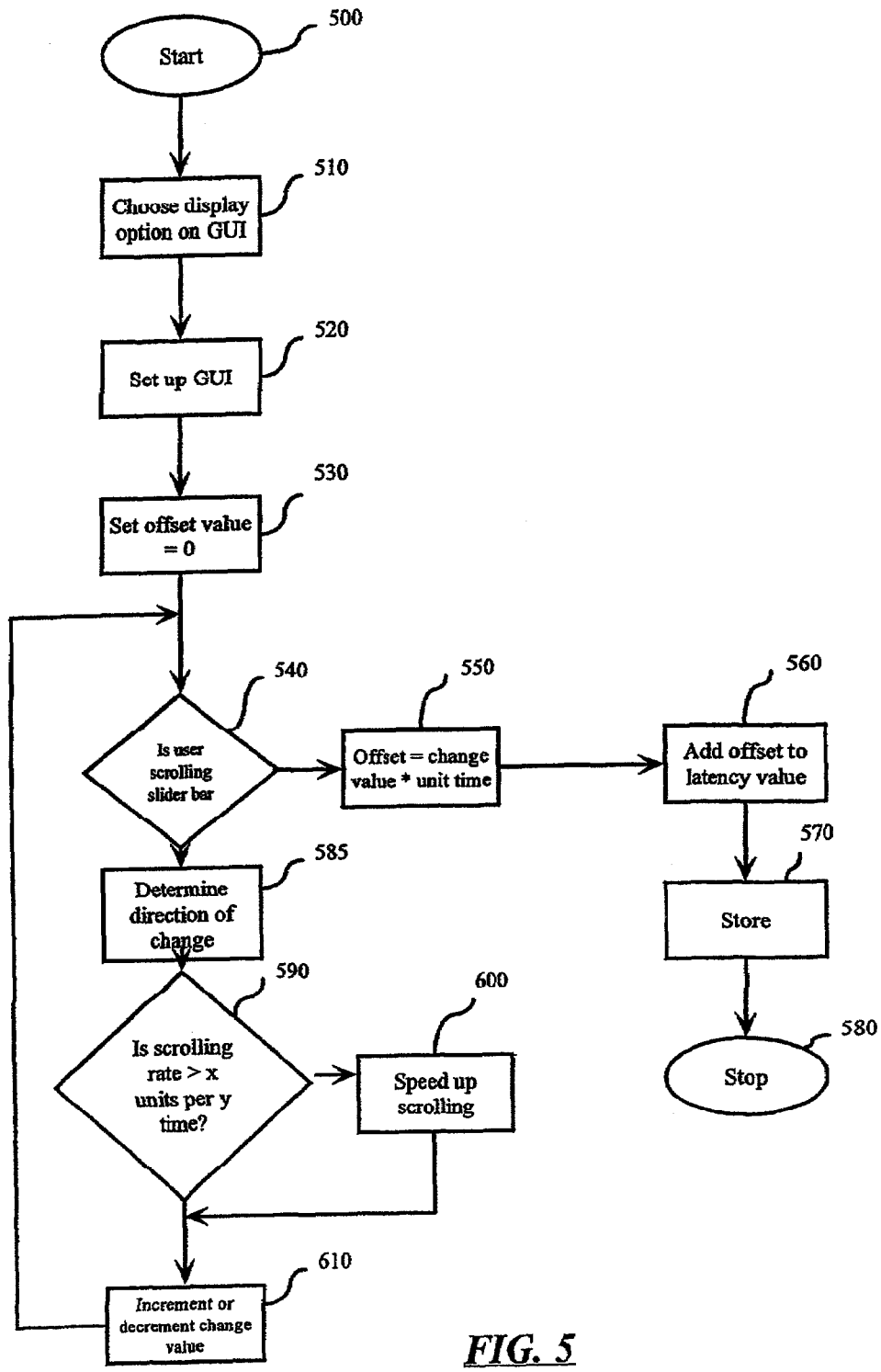
FIG. 5 illustrates a flow chart for an exemplary embodiment of the process for manually synchronizing the audio playback of two or more devices.

FIG. 5 illustrates a flow chart for an exemplary embodiment of the process for manually synchronizing the audio playback of two or more devices. Initially, a graphical user interface (GUI) may be set up to display several display options, including the identification of all or part of a set of audio playback devices, steps 500, 510, 520. An offset value for the latency value is zeroed, step 530. The processor checks to see if a user is moving the slider bar, step 540. If the user is not moving the scroll bar, the offset is calculated by multiplying the change value by the unit time (for instance, the base clock period), step 550. This value is added or subtracted from the latency value, step 560, and stored, steps 570 and 580. If the user is scrolling, then the direction of change is determined, step 585. If the scrolling has been consistent and of a sufficient length of time, scrolling speed is increased, step 600. The change value is increased or decreased as a result of the scrolling direction and speed, step 605.

FIG. 6 illustrates horizontal sliding bars for a graphical user interface for manual synchronization. Two slider bars 700 and 720 are placed one above another. The sliding bar for subordinate device PCn has a movable marker 730 to allow the user to manually set the latency value offset for that device. The marker for the sliding bar 700 for control device PCA may or may not be movable.

FIG. 7 illustrates vertical bars for a graphical user interface for manual synchronization. Two or more subordinate devices, PCB and PCC, may be represented on a GUI. The number and names of the devices displayed may be chosen by the user. It may be preferable to select a small number of subordinate devices since it may be easier to determine which, if any, of those devices need to be adjusted. Here, control device PCA is shown as a vertical bar 800 with a separate scroll bar 810 having up and down arrows 820 and 830. Likewise, subordinate device PCB is shown as a vertical bar 840 with a separate scroll bar 850 having up and down arrows 860 and 870 and subordinate device is shown as a vertical bar 880 with a separate scroll bar 890 having up and down arrows 900 and 910. The vertical bars 800, 840, and 880 may grow, shrink, or remain the same size during manual adjustment. A screen may appear to allow the user to select which devices should appear on the GUI.

Data entry on the GUI may be accomplished by manual entry on a keyboard, through a touch screen, or by a hand held device such as a mouse or track ball, or other means.

It is believed that the method to synchronize playback of multicast audio streams on a local network of the present invention and many of its attendant advantages will be understood by the forgoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof. It is the intention of the following claims to encompass and include such changes.

What is claimed is:

1. A method of audio synchronization on a home network, comprising:

sending digital audio streams to two or more receiver devices, said digital audio streams including a control code to a specific one of the two or more receiver devices;

outputting sound wave signals from two or more receiver devices on the home network;

recording a first time difference between a first time of sending a control code to the specific one of the two or more receiver devices and a second time the sound wave signal is received from the specific one of the two or more receiver devices;

recording a second time difference between a third time of sending a control code to an other specific one of the two or more receiver devices and a fourth time the sound wave signal is received from the other one of the two or more receiver devices; and automatically adjusting a relative delay of the sound wave signals outputted from the specific one of the two or more receiver devices;

wherein the relative delay is adjusted by buffering the digital audio stream received in the specific one of the two or more receiver devices.

2. The method of claim 1, wherein the step of automatically adjusting the relative delay eliminates or substantially reduces an echo effect to the listener.

3. The method of claim 1, wherein the listener manually fine tunes the audio playback, further comprising the steps of:
displaying graphics on a graphical user interface which represent a control mechanism for adjusting the time delay between two or more audible signals;
moving a graphics object of a graphics control mechanism so as to increase or decrease a timing delay in reference to the two or more audible signals; and
once the signals are determined to be properly adjusted by the user, recording the additional delay for receiver devices and sending this information to the receiver devices.

4. The method of claim 3, wherein moving the graphics object entails using a mouse by an adjuster.

5. The method of claim 3, wherein moving the graphics object entails using a touch screen by an adjuster.

6. The method of claim 3, wherein moving the graphics object entails using a track ball by an adjuster.

7. The method of claim 1, wherein the relative delay is derived by enabling a counter from the time the control code is sent until the time of the receipt of the sound wave signal.

8. The method of claim 1, wherein the digital audio streams are buffered by the receiving devices, the first time difference and the second time difference each being at least partially due to the amount of delay caused by the buffering.

9. The method of claim 3, wherein the graphical user interface includes sliding bars or scroll bars.

10. The method of claim 9, wherein a user chooses the display option on the graphical user interface.

11. The method of claim 9, wherein an offset value is determined in response to scrolling of the scroll bars or sliding of the sliding bars by the user.

12. The method of claim 11, wherein the speed of the scrolling or sliding is changeable.

13. The method of claim 12, wherein the offset value is added to or subtracted from a latency value for one of the receiving devices and stored.

14. The method of claim 3, wherein the step of moving a graphics object involves audible pulses emanating from each of the devices to be adjusted and a reference device.

15. The method of claim 1, wherein the sound wave signal is audible.

16. The method of claim 1, wherein the sound wave signal is inaudible.

17. A system for synchronizing audio playback of multiple receiving devices, comprising:
a transmitting device configured to transmit digital audio stream data with embedded control code;
two or more receiving devices, each of which is configured to produce an audio pattern based on the control code embedded in the digital audio stream, wherein the receiving devices are synchronized by comparing time differences from times the control codes are sent from the transmitting device to each of the two or more receiving devices to reception of audio patterns based on the control codes transmitted from each of the two or more receiving devices to the transmitting device; and
means for buffering the audio stream data in at least one of the two or more receiving devices by a relative delay equal to said time differences;
wherein the audio patterns are detected by a microphone in proximity to the transmitting device.

18. The system of claim 17, wherein one of the devices allows a user to manually synchronize the audio playback of the devices.

19. The system of claim 17, wherein the system has manual fine tune control.

20. The system of claim 17, wherein a communication latency is shorter than the time interval between consecutive control codes to the same receiver device.

21. The system of claim 17, wherein the transmitting device transmits the audio stream data via a wire or cable to the two or more receiving devices.

22. The system of claim 17, wherein the transmitting device transmits the audio stream data wirelessly.

23. The system of claim 17, wherein the transmission of the audio stream data is via radio frequency signals.

24. The system of claim 17, wherein the transmission of the audio stream data is via infrared signals.

25. The method of claim 1, wherein the home network comprises at least one PC.

26. The system of claim 17, wherein the system comprises a home network including at least one PC.

27. A method of audio synchronization on a home network, comprising:
sending a first digital audio stream including an embedded first digital control code from a source device to a first receiver device;
producing a first audio pattern by the first receiver device based on said first digital control code, said first audio pattern being detected by a pickup device;
determining a first time difference between the sending of the first digital control code and the detection of the first audio pattern by the pickup device;
sending a second digital audio stream including an embedded second digital control code from the source device to a second receiver device;
producing a second audio pattern by the second receiver device based on said second digital control code, said second audio pattern being detected by the pickup device;
determining a second time difference between the sending of the second digital control code and the detection of the second audio pattern by the pickup device;
calculating a relative delay between the first and second time differences; and
buffering one of the first or second digital audio streams by an amount of time based on the calculated relative delay to synchronize audio outputs from the first and second receiver devices;
wherein said first audio pattern and said second audio pattern are not audible to humans.

28. The method of claim 27, wherein the pickup device is attached to the source device.

29. The method of claim 27, wherein the one of the first or second digital audio streams associated with the shortest of the first or second time differences is buffered by the amount of time based on the calculated relative delay.

30. The method of claim 27, further comprising:
playing audio content by said first and second receiver devices in addition to producing the first and second audio patterns, said audio content being respectively based on the first and second digital audio streams.

* * * * *